United States Patent
Helmick et al.

(12) 
(10) Patent No.: US 6,381,089 B1
(45) Date of Patent: Apr. 30, 2002

(54) TAPE CASSETTE STORAGE AND ACCESSING SYSTEM WITH CLOSELY SPACED LAYERED CASSETTES

(75) Inventors: Mark H. Helmick, Ventura; William J. Lurie, Thousand Oaks, both of CA (US)

(73) Assignee: Qualstar Corporation, Canoga Park, CA (US)

( * ) Notice: Subject to any disclaimer, the term of this patent is extended or adjusted under 35 U.S.C. 154(b) by 0 days.

(21) Appl. No.: 09/627,666

(22) Filed: Jul. 28, 2000

(51) Int. Cl.[7] .............................................. G11B 15/68
(52) U.S. Cl. ...................... 360/92; 242/337.1
(58) Field of Search ............................ 360/92; 242/337, 242/337.1

(56) References Cited

U.S. PATENT DOCUMENTS

| | | |
|---|---|---|
| 811,720 A | 2/1906 | Herder |
| 1,389,887 A | 9/1921 | Leyland et al. |
| 1,787,898 A | 1/1931 | Fuller |
| 2,260,528 A | 10/1941 | Levy et al. |
| 2,339,494 A | 1/1944 | Lubahn |
| 2,636,799 A | 4/1953 | Lyon et al. |
| 3,265,011 A | 8/1966 | Golden |
| 3,389,804 A | 6/1968 | Lyon |
| 3,655,031 A | 4/1972 | Cahn |
| 3,756,609 A * | 9/1973 | Sato ............................. 360/92 |
| 3,807,741 A * | 4/1974 | Uemura ........................ 360/92 |
| 3,854,570 A | 12/1974 | Kornylak |
| 4,063,294 A * | 12/1977 | Burkhart ....................... 360/92 |
| 4,067,437 A | 1/1978 | Frantl et al. |
| 4,361,858 A * | 11/1982 | Chambers ..................... 360/92 |
| 4,643,495 A | 2/1987 | Pepping et al. |
| 5,207,314 A | 5/1993 | Ueda et al. |
| 5,339,968 A | 8/1994 | Voelz |
| 5,498,116 A | 3/1996 | Woodruff et al. |
| 5,847,897 A * | 12/1998 | Marlowe ....................... 360/92 |
| 5,856,894 A * | 1/1999 | Marlowe ....................... 360/92 |
| 5,967,339 A | 10/1999 | Utsumi et al. |
| 6,006,897 A | 12/1999 | Faure et al. |

* cited by examiner

Primary Examiner—Craig A. Renner
(74) Attorney, Agent, or Firm—Oppenheimer Wolff & Donnelly LLP

(57) ABSTRACT

A compact tape cassette or cartridge storage and accessing system includes a longitudinally extending frame with two endless link chains, one on each side of the frame; and cassette carriers are mounted in two layers by linkages to the chains, with one layer moving forward and the other to the rear. At the ends, a cam follower on each cassette carrier, and a control groove, and associate guide and latch members, tilt the cassette carriers to smoothly shift them from one layer to the other. With 8 mm tape cassettes, the height of the system is within 1¾ inches, for compatibility with standard electrical equipment racks.

21 Claims, 4 Drawing Sheets

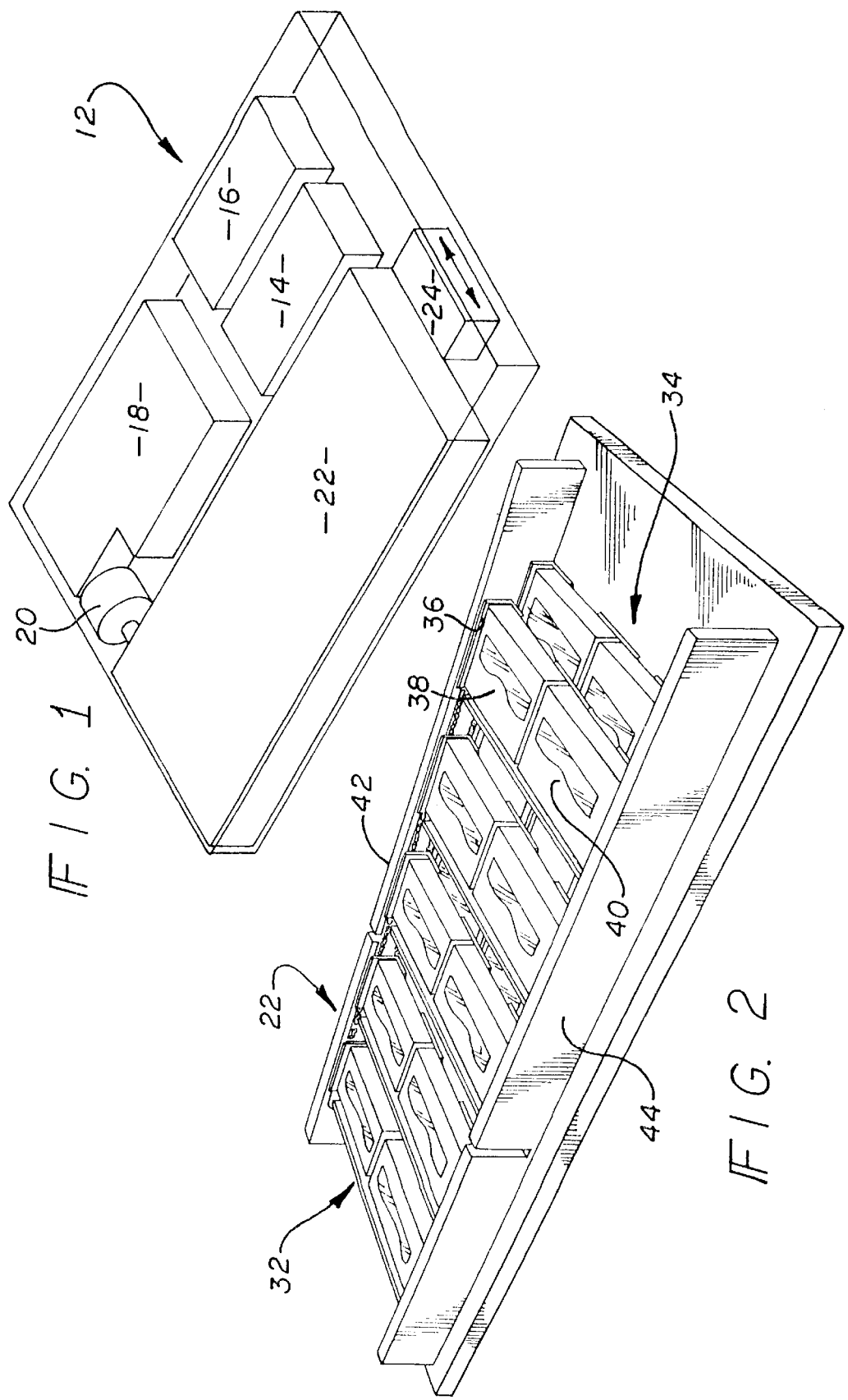

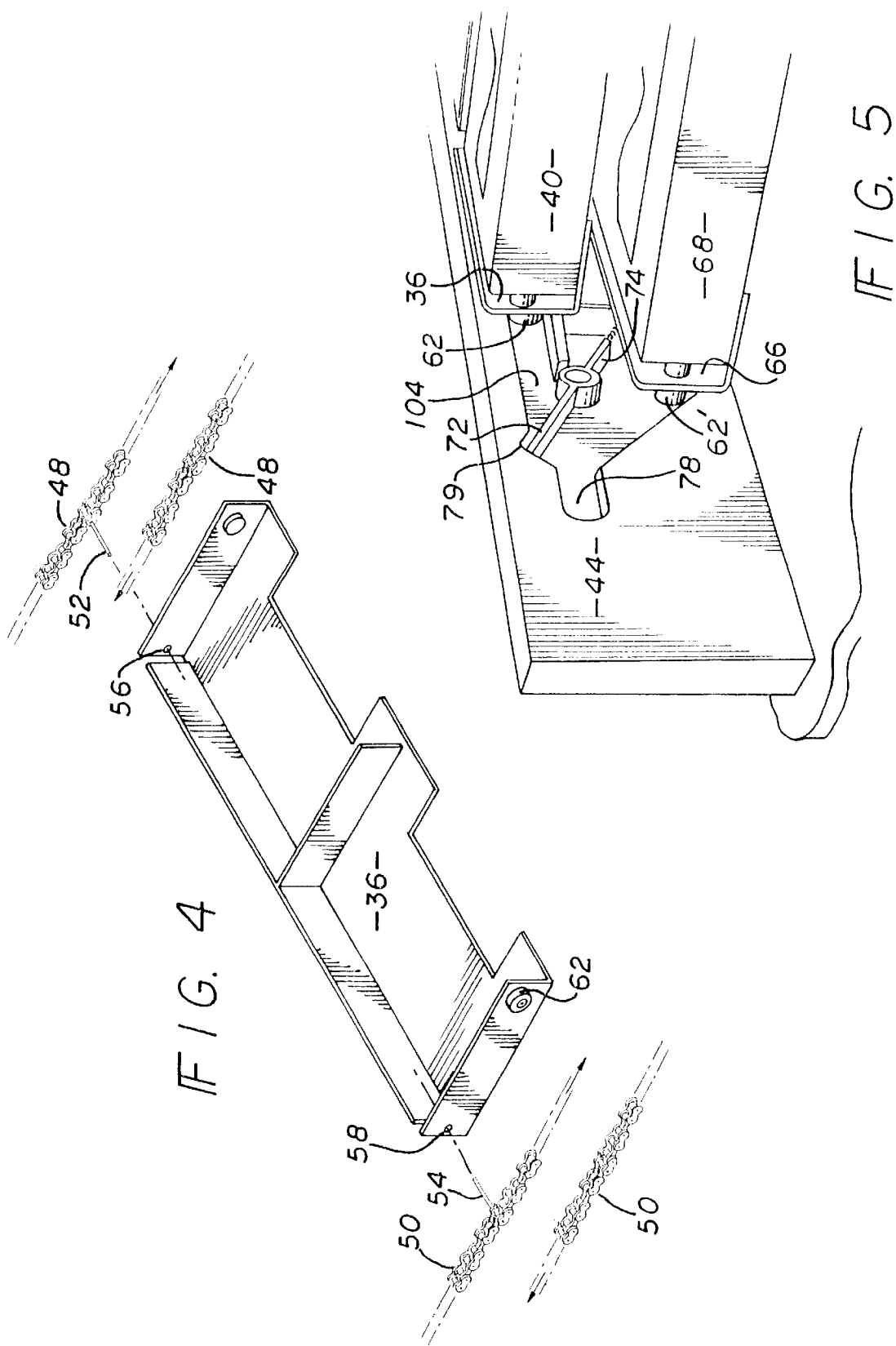

TAPE CASSETTE STORAGE AND ACCESSING SYSTEM WITH CLOSELY SPACED LAYERED CASSETTES

FIELD OF THE INVENTION

This invention relates to magnetic tape storage and accessing systems for tape libraries, for example, or for backup storage of digital information.

BACKGROUND OF THE INVENTION

Tape libraries are known in the field as indicated by U.S. Pat. No. 5,498,116, granted Mar. 12, 1996, and as disclosed in U.S. patent application Ser. No. 08/427,884, filed Apr. 26, 1995, and assigned to the assignee of this invention. In these systems, a large number of tape cassettes or cartridges are stored in tower-like configurations, and transfer mechanisms are provided for selecting designated tape cassettes and transporting them to a tape drive where data may be accessed from the tape cassettes or written into the tape cassette or cartridge.

One disadvantage of these known prior art arrangements is that they take up more space than is desirable. Thus, for example, standard electronic racks for mounting electronic equipment are normally 19 inches wide and have vertical spaces for storing electronic equipment in, in terms of standard increments or units of height equal to one and three quarters (1¾) inches. Electronic equipment intended for rack mounting is normally designed to occupy a predetermined number of units of height, such as one unit of height (1¾ inches) or two or three units of height (3½ inches or 5¼ inches respectively).

If the prior art tape library systems as identified above were to be mounted in standard electronic racks, they would occupy a large number of units of height, such as at least five or ten units of height, and this would be considered very wasteful of available rack space.

SUMMARY OF THE INVENTION

Accordingly, a principal object of the invention is to provide a magnetic tape cassette or cartridge storage and accessing system which is compact and which is compatible with standard electronic rack dimensions.

In accordance with one illustrative embodiment of the invention, the tape cassette storage and accessing system includes a linearly extending frame, with two sides, and link chains mounted respectively on the two sides, with tape cassette or cartridge carriers having linkages interconnecting one end of each cassette carrier to both chains, and with each of the chains extending in a closed loop between the front and rear of the frame, with the upper portion of each chain being substantially parallel to the lower portion and with the two sections of chain being spaced apart by a distance which is slightly greater than the thickness of the carriers when loaded with cassettes. The cassette carriers are mounted to said chains in two layers with the upper layer moving in one direction and the lower layer moving in the opposite direction, and with each layer including a plurality of cassette carriers. Each cassette carrier may also have at least one cam follower for engaging grooves in one or both sides of the frame, for guiding the carriers and for tilting the carriers at the two ends of the frame to smoothly shift the cassette carriers from one of the layers of carriers to the other layer.

Concerning other aspects of the invention, it may involve the following factors:

(1) Instead of a link chain, a toothed belt or a continuous flexible line may be used.

(2) At the front and/or the rear of the frame, a movable guide and latch may be provided for positively controlling shifting of the carriers from one layer to the other.

(3) Instead of a cam follower and groove, the sides of the frame may be provided with a ridge or rib engaged by a forked cam follower or the cassette carrier.

(4) The system may be provided with an electromagnetic actuator for positively shifting the carriers from one layer to the other instead of the guide and latch arrangements.

(5) The cassette or cartridge carriers may be in the form of open trays, or may have structure enclosing the cassettes on both of the broader sides of the cassettes.

The design as described herein above may be employed with 8 mm tape cartridges and is successful in achieving a height of one unit, or one and three-quarters inches, for an electronic rack mounted unit. This is considered to be a surprising accomplishment when two 8 mm tape cassettes stacked on top of one another have a height of 1⅛ or 1 3/16 inches. In this space of 1¾ inches of height, 17¾ of width and a depth of about two feet, a complete tape library may be contained, giving access to any of twenty-four 8 mm magnetic tape cassettes, with the cassettes being mounted with two cassettes side by side on each carrier, and with two layers of six carriers each.

Other objects, features and advantages of the invention will become apparent from the following detailed description and from the accompanying drawings.

BRIEF DESCRIPTION OF THE DRAWINGS

FIG. 1 is a perspective block diagram of the layout of a tape library, showing a relatively flat configuration appropriate for rack mounting;

FIG. 2 is a front angular perspective of a tape cassette or cartridge storage and access system illustrating the principles of the invention;

FIG. 4 is a diagrammatic showing of a single carrier or tray for holding two cassettes, along with the chains and linkages by which the carriers are advanced;

FIG. 5 is an enlarged perspective view of the front of the system of FIGS. 2 through 4, showing the mechanism for shifting the cassette carriers smoothly from the upper layer to the lower layer of carriers;

BRIEF DESCRIPTION OF PREFERRED EMBODIMENTS

Figure 7:
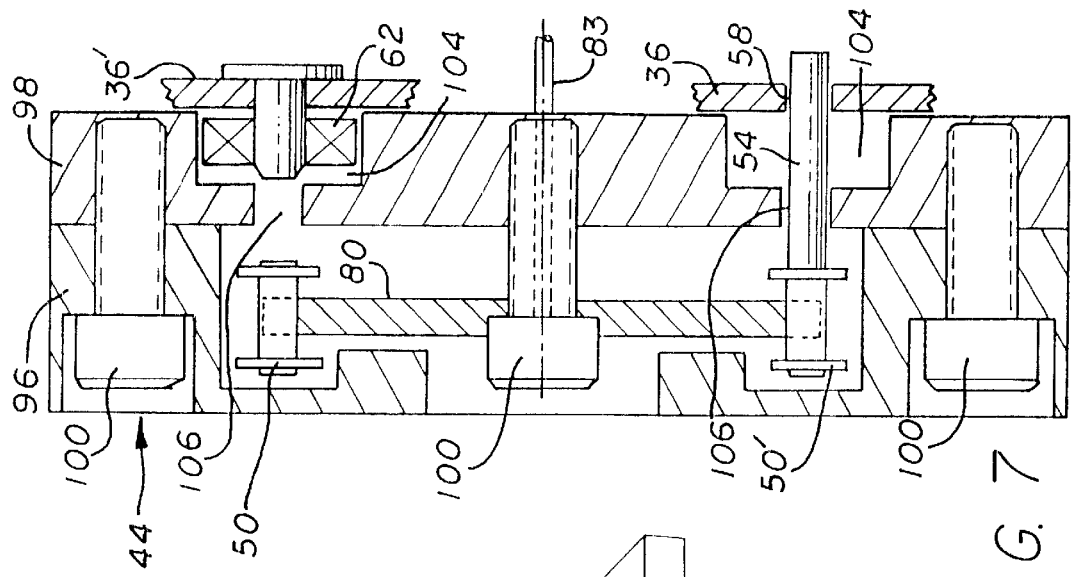
FIG. 7 is a cross-sectional view taken along line 7—7 of FIG. 6, and showing a drive chain, a drive sprocket, a linkage between one of the chains and a cassette carrier, and a cassette carrier cam follower in a mating guide channel.

Referring more particularly to the drawings, FIG. 1 is a schematic showing of the layout of a tape library 12 with minimal elevation, to facilitate accommodation to electronic rack mounting. In FIG. 1, the two tape drives 14 and 16 may for example be conventional tape drives, such as a SONY 8 mm helical scan tape drive. The control and drive electronics 18 and the drive motor 20 may be mounted behind the drives 14, 16. The tape cassette storage and access system, to which detailed attention will be given, is shown at reference numeral 22. The transfer mechanism 24 is employed to bring selected cassettes from the storage and access system 22 to a selected drive 14 or 16. The transfer mechanism 24 may be similar in operation to the transfer mechanisms shown in the U.S. Patent and/or the patent application cited above, with a carriage moving between a selected one of the drive units 14 or 16 and in front of one of the two cassettes served up by the storage and access system 22. Once the transfer unit 24 is properly positioned, it clamps onto the selected cassette for transfer between drive units 14 or 16 and one of the cassette storage carriers of the unit 22, and inserts and releases the cassette at the input to the selected receiving unit. The foregoing is accomplished under the control of the electronics unit 18.

The construction and mode of operation of the tape cassette or cartridge storage and access unit will now be described in greater detail in connection with FIGS. 2 through 7 of the drawings.

More specifically, in the perspective view of FIG. 2, an upper layer of cassette carriers 32 and a lower layer of cassette carriers 34 are shown. Each cassette carrier, such as carrier 36 (in the front of the upper layer 32) carries two 8 mm magnetic tape cassettes 38 and 40. The upper layer 32 of carriers moves in one direction, while the lower layer 34 is driven in the other direction under the control of a pair of link chains similar to bicycle chains, as described in more detail hereinbelow.

Figure 3:
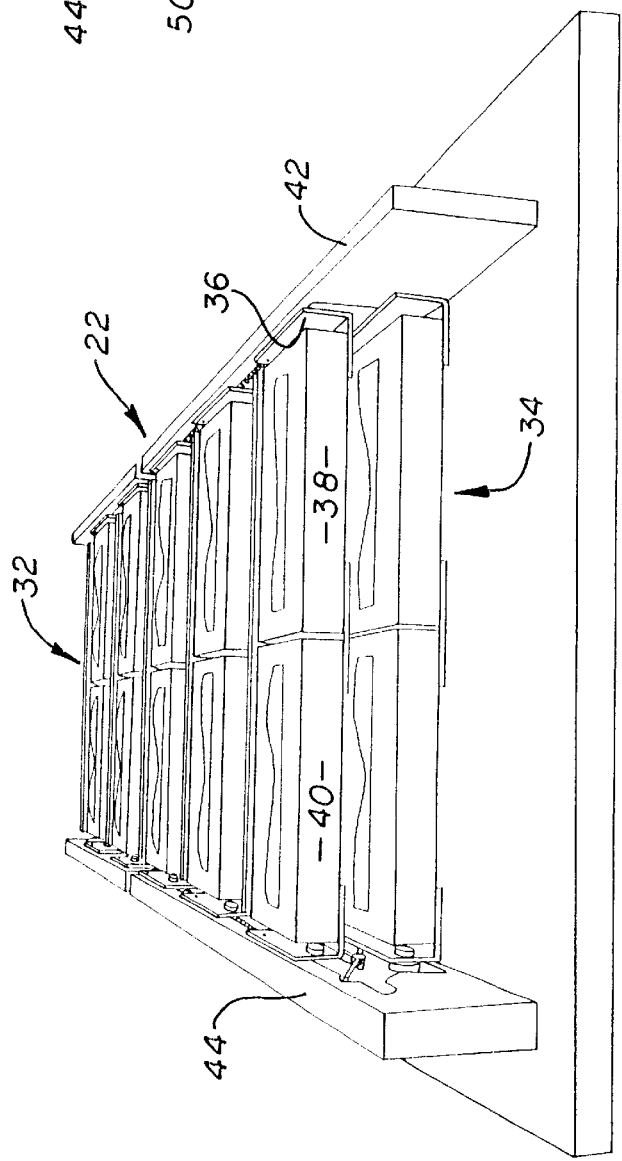
FIG. 3 is a front perspective view of the system of FIG. 2.

Referring both to FIGS. 2 and 3, it may be noted that the frame of the unit 22 has two sides 42 and 44. FIG. 4 is a diagram showing the way the cassette carriers such as carrier 36 are mounted on and driven by the chains 48 and 50, located at the sides 42 and 44 of the unit 22.

The chains 48 and 50 have a series of inwardly directed pins or linkages, shown at 52 and 54 in FIG. 4, between the chains and the cassette carriers. The cassette carriers such as carrier 36 have mating holes 56 and 58 for receiving pins 52 and 54, respectively. The linkages 52 and 54 couple to the carriers at the rear thereof, permitting pivoting of the carriers about the pins. Toward the front of the carriers, such as carrier 36, are cam followers such as element 62 which controls tilting of the carriers relative to the pins 52, 54. A cam follower such as element 62 may be located on only one side or symmetrically on both sides of each cassette carrier, such as carrier 36.

Referring now to FIG. 5, one preferred arrangement for smoothly shifting the cassette carriers from the upper layer 32 of carriers to the lower layer 34 of carriers is shown. In FIG. 5, the upper layer of cassette carriers including carrier 36 with one cassette 40 is shown at the front coming forward, with a lower carrier 66 with one of its two cassettes 68 being shown as part of the lower layer starting to move to the rear. The lower carrier 66 has a cam follower 62' corresponding to the cam follower 62 on the upper carrier 36. A pivoting guide and latch number 72 is biased in the clockwise direction by a spring 74, as seen to advantage in alternative positions in FIGS. 5 and 7.

As the chain 50 moves the carrier 36 forward, the cam follower 62 engages the latch and guide member 72, tilting it counterclockwise so that the cam follower 62 moves forward into recess 78 (see FIG. 5). As the chain passes over the front sprocket and starts down and to the rear, the latch and guide 72 shift back, and the cam follower 62 is directed downward to the position shown at 62', thus smoothly causing the transition of the upper layer of cassette carriers 32, including carrier 36 (moving forward), to the lower layer of carriers 34, including carrier 66 (moving toward the rear).

Figure 6:
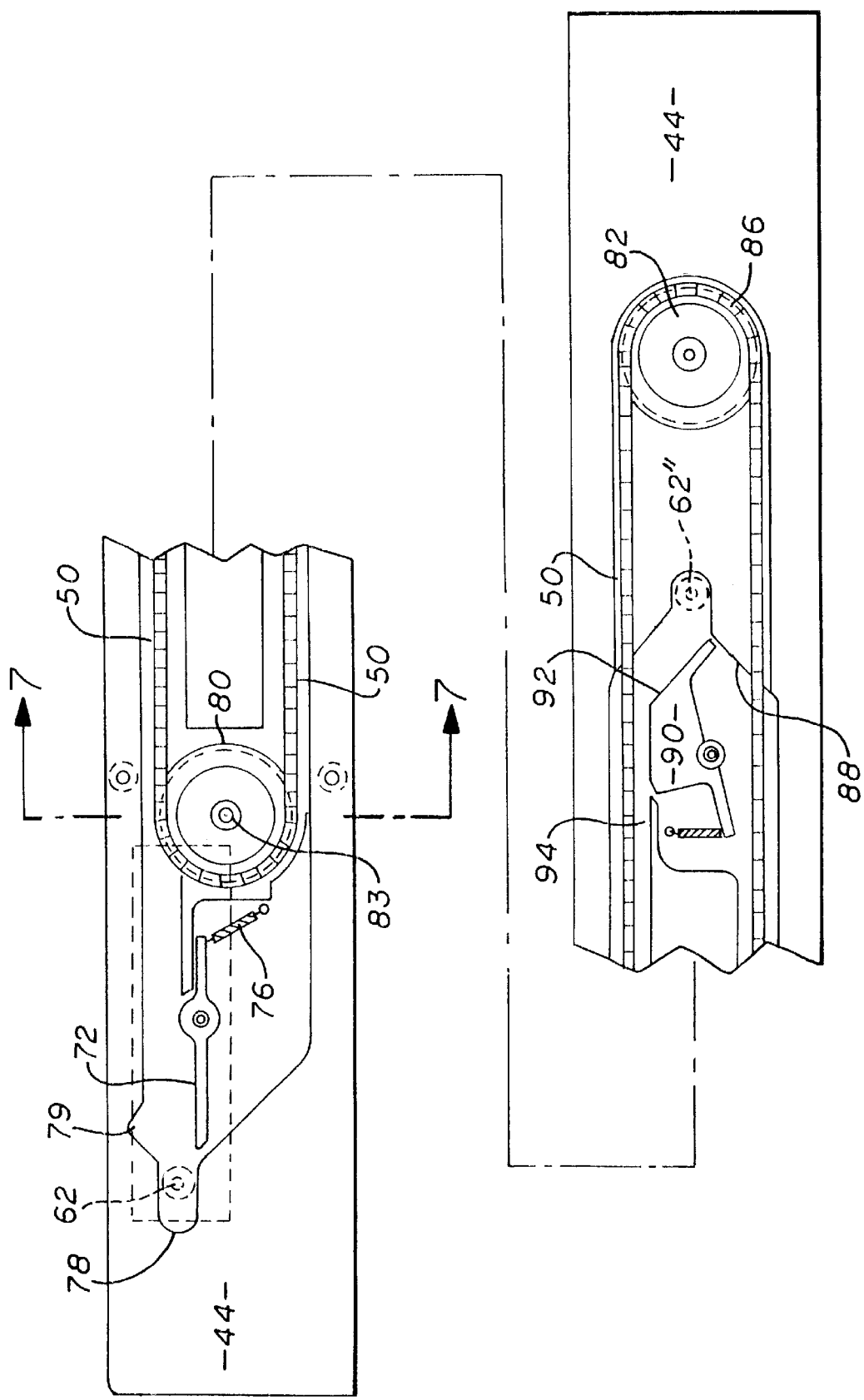
FIG. 6 is a broken-away inner side view of one side of the system of FIGS. 2 and 3, showing the drive chain and the front and rear mechanisms for accomplishing smooth transitions of the tape cassette carriers between the upper and lower layers of carriers, as they are circulated by the endless drive chains.

FIG. 6 is an inner side view of the side wall 44 showing the guide, a latch member 72 tilted counterclockwise by the passage of cam follower 62, and about to be restored to its full clockwise position with the tip of member 72 resting against stop surface 79, under the bias force provided by extension spring 74.

FIG. 6 also shows the chain 50 with the front sprocket 80 and the rear sprocket 82. Incidentally, of course, the two chains 48 and 50 (see FIG. 4) on the two sides 42 and 44 operate in synchronism. In this regard, the rear sprocket (not shown) for chain 48 is driven by the motor 20 (see FIG. 1). Chain 48 drives the front sprocket for side 42, which includes shaft 83, which extends across from side 42 to side 44; and the two chains 48 and 50 are therefore driven synchronously. With the pivot linkages from the chains to the cassette carriers being at the rear of each carrier, the cassette carriers pass under the axle 83 without interference. However, at the rear of the unit 22, the cassette carriers pass through the space extending across between the two rear sprockets, including sprocket 82, so the direct extensions of a drive shaft between the two rear sprockets is not practical. Of course, if desired, the carriers could be pivoted at the front corners instead of the rear corners, and with this modification, the rear sprockets could be directly coupled by a common drive shaft.

Turning now to the rear of side 44, as shown at the lower portion of FIG. 6, when the cassette linkages are being carried around sprocket 82, for example with one of the carrier linkage pins being at point 86, the cam follower indicated at 62" will have been guided up ramp 88 and will have pivoted the rear guide and latch member 90 counterclockwise to reach the position shown by the dash-dot circle 62". Then, as the chain 50 continues in its path, the cam follower 62" will be guided upward along surface 92 of the latch guide 90 into the upper guide channel 94. This arrangement again provides a smooth transition of the cassette carriers from rearward movement along the lower layer of cassette carriers to forward movement along the upper layer of cassette carriers.

Now, turning to the last FIG. 7 of the drawings, it is a cross-sectional view through side 44 of the unit 22, taken along the plane indicated by the dash-dot lines in FIG. 6. As shown in FIG. 7, the side 44 may be formed of two parts 96 and 98, which are bolted together by bolts 100. The sprocket 80 carries the chain, with the upper portion of the chain designated 50 coming out of the paper, and the lower part of the chain designated 50' going into the paper, in the showing of FIG. 7. Also shown in FIG. 7 is the guide pin 54 extending into an opening 58 at the rear of a cassette carrier 36. Another cassette carrier designated 36' in FIG. 7 is shown with its cam follower 62 in the form of a small bearing, extending into the guide channel or camming recess 104. In this regard, it may be noted that the linkage pins 54 extend through the guide channel 104, and thus that the guide channels and the slots 106 through which the linkage pins extend are coincident except for the front and rear of the sides 42 and 44. More specifically, at the front, the guide channels for the cam followers 62 extend beyond the sprocket as shown in the upper portion of FIG. 6; and the slots for the guide pins extend to the rear beyond the ramp 88 for the cam follower 62" as shown in the lower portion of the drawing of FIG. 6. Incidentally, in FIG. 7, toward the center of the figure, the drive shaft 83 intercoupling the two front sprockets is shown schematically, with the showing of the sprocket shaft overlying one of the bolts 100 holding the two sections 96 and 98 of the side wall 44 together.

In closing, it is to be understood that the foregoing detailed description and accompanying drawings relate to one preferred illustrative embodiment of the invention. Various changes and modifications may be made without departing from the spirit and scope of the invention. Thus, by way of example and not of limitation: (1) the lower layer of cassette carriers may move forward, and the upper layer may move to the rear; (2) the cassette carriers may be pivotally mounted at the front or centrally, instead of at the rear; (3) the cassette carriers can hold any desired number of cassettes, such as one or three cassettes, for example; (4) the cassette carriers may be provided with either one or two cam followers and associated side guides; (5) the cassette carriers may be provided with forked cam or ridge followers, and the sides of the units may have mating ribs or ridges for guiding the pivoting of the cassette carriers; (6) instead of or supplementary to the mechanical latch and guide mechanisms, the system may be provided with sensing arrangements for determining the position of the cassettes, and electromagnetic actuators for insuring layer to layer transitions at the front and rear of the units; (7) the pin receiving slots and the guide channels may be separate and spaced from one another; (8) a notched resilient belt may be employed instead of the chains, or even a continuous belt with electronic sensing for the position of the cassette carriers, could be employed; and (9) the correspondence between cassette locations and cassette carriers may be facilitated by a unique configuration or digital marking of each carrier, with corresponding electronic sensing arrangements. Accordingly, the invention is not limited to the embodiment shown in the drawings and described in detail herein above.

What is claimed is:

1. A compact tape cassette storage and accessing system comprising:
    a longitudinally extending frame having first and second sides and front and rear ends;
    first and second link chains mounted respectively on said first and second sides;
    sprockets for engaging said chains and driving them synchronously;
    a plurality of cassette carriers, said cassette carriers having a front and a rear;
    linkages pivotally connecting the rear of each of said cassette carriers to said chains;
    each of said chains extending in a closed loop from the front to the rear of said frame with an upper portion of said chain substantially parallel to a lower portion of said chain and spaced apart from said lower portion of said chain by a distance which is slightly greater than the thickness of said cassette carriers when loaded with cassettes, and said cassette carriers being mounted to said chains in two layers, an upper and a lower layer, with the upper layer moving in one direction and the lower layer moving in the opposite direction, and with each layer including a plurality of said cassette carriers;
    at least one cam follower mounted on and extending outwardly from the front of each of said cassette carriers; and
    a groove in at least one of said sides of said frame for receiving said cam follower and for guiding said cassette carriers and for tilting said carriers at the two ends of said frame to smoothly shift said cassette carriers between one of said layers of cassette carriers and the other of said layers of cassette carriers; and
    whereby said cassette carriers are successively brought to the front of said frame so that a cassette mounted in any of said cassette carriers may be accessed for purposes of transporting said cassette to or from a reading and/or writing device.

2. A compact tape cassette storage and accessing system as defined in claim 1 wherein said system includes a movable guide and latch at the front of said groove, actuated by said cam follower on each carrier to smoothly shift said carrier from one of said layers of cassette carriers to the other of said layers of cassette carriers.

3. A compact tape cassette storage and accessing system as defined in claim 2 wherein said system has a second guide and latch at the rear of said groove to shift said cassette carriers between the two layers of cassette carriers.

4. A compact tape cassette storage and accessing system as defined in claim 1 wherein the front to back extent of said carriers is substantially greater than the height of two layers of said cassette carriers loaded with cassettes.

5. A compact tape cassette storage and accessing system as defined in claim 1 wherein the cassette carriers in said upper and lower layers have cassette receiving spaces on the upper surfaces thereof.

6. A compact tape cassette storage and accessing system as defined in claim 1 wherein said linkages are in the form of pins extending inwardly from said chains.

7. A compact tape cassette storage and accessing system as defined in claim 1 wherein said linkages extend through said groove for most of the length of said chains.

8. A compact tape cassette storage and accessing system as defined in claim 3 wherein said second guide and latch includes a guiding surface for directing the cam follower toward the desired layer of cassette carriers, and wherein said second guide and latch are spring biased to the orientation thereof in which said guiding surface directs said cam follower to the desired layer of cassette carriers.

9. A compact tape cassette storage and accessing system as defined in claim 1 wherein a drive shaft intercouples said sprockets, and each said chain is mounted on a pair of said sprockets, and wherein a first said sprocket on one side of said system is mounted on said drive shaft and a second said sprocket on the other side of said system mounted on said drive shaft, in a location wherein said cassette carriers do not move through the space extending from the axis of said first sprocket to the axis of said second sprocket.

10. A compact tape cassette storage and accessing system comprising:
    a longitudinally extending frame having first and second sides and front and rear ends;
    first and second flexible drives mounted respectively on said first and second sides;
    a motor for moving said flexible drives;
    a plurality of cassette carriers, said cassette carriers having a front and a rear;
    linkages pivotally connecting the rear of each of said cassette carriers to said flexible drives;
    each of said flexible drives extending in a closed loop from the front to the rear of said frame with an upper portion of said flexible drive substantially parallel to a lower portion of said flexible drive and spaced apart from said lower portion of said flexible drive by a distance which is slightly greater than the thickness of said carriers when loaded with cassettes, and said cassette carriers being mounted to said flexible drives in two layers, an upper and a lower layer, with the upper layer moving in one direction and the lower layer moving in the opposite direction, and with each layer including a plurality of said cassette carriers;

at least one cam follower mounted on and extending outwardly from the front of each of said cassette carriers; and at least one groove in at least one of said sides of said frame for receiving said cam follower and for guiding said cassette carriers and for tilting said carriers at the two ends of said frame to smoothly shift said carriers between one of said layers of cassette carriers and the other of said layers of cassette carriers;

whereby said cassette carriers are successively brought to the front of said frame so that a cassette mounted in any of said carriers may be accessed for purposes of transporting said cassette to or from a reading and/or writing device.

11. A compact tape cassette storage and accessing system as defined in claim 10 wherein said system includes a movable guide and latch at the front of said at least one groove, actuated by said cam follower on each carrier to smoothly shift said carrier from one of said layers of cassette carriers to the other of said layers of cassette carriers.

12. A compact tape cassette storage and accessing system as defined in claim 11 wherein said system has a second guide and latch at the rear of said groove to shift said cassette carriers between the two layers of cassette carriers.

13. A compact tape cassette storage and accessing system as defined in claim 10 wherein the cassette carriers in said upper and lower layers have cassette receiving spaces on the upper surfaces thereof.

14. A compact tape cassette storage and accessing system as defined in claim 10 wherein said linkages are in the form of pins extending inwardly from said flexible drives.

15. A compact tape cassette storage and accessing system as defined in claim 10 wherein said linkages extend through said at least one groove for most of the length of said flexible drives.

16. A compact tape cassette storage and accessing system as defined in claim 12 wherein said second guide and latch includes a guiding surface for directing the cam follower toward the desired layer of cassette carriers, and wherein said second guide and latch are spring biased to the orientation thereof in which said guiding surface directs the said cam follower to the desired layer of cassette carriers.

17. A compact tape cassette storage and accessing system comprising:

a longitudinally extending frame having first and second sides and front and rear ends;

first and second flexible drive lines mounted respectively on said first and second sides;

circular drive members for engaging said flexible drive lines and driving them synchronously;

a plurality of cassette carriers, said cassette carriers having a front and a rear;

linkages pivotally connecting the rear of each of said cassette carriers to said flexible drive lines;

each of said flexible drive lines extending in a closed loop from the front to the rear of said frame with an upper portion of said flexible drive line substantially parallel to a lower portion of said line and spaced apart from said lower portion of said flexible drive line by a distance which is slightly greater than the thickness of said cassette carriers when loaded with cassettes, and said cassette carriers being mounted to said flexible drive lines in two layers, an upper and a lower layer, with the upper layer moving in one direction and the lower layer moving in the opposite direction, and with each layer including a plurality of said cassette carriers;

said cassettes each having a width, a length and a thickness, with the width and length of each said cassette being at least several times greater than said thickness, and said cassettes having broad upper and lower surfaces defined by said width and said length; and cam followers and associated grooves constraining the movement and orientation of said cassette carriers so that the cassettes in said upper and lower layers have their broad surfaces parallel to one another and to the direction of travel of said cassette carriers, and having the orientation of the cassettes in said upper and lower layers being substantially the same, and with the spacing between said layers being less than the maximum dimension of each said cassette.

18. A compact tape cassette storage and accessing system as defined in claim 17 wherein a guide is provided at each end of said frame to tilt each said carrier to make a smooth transition from one layer to the other layer.

19. A compact tape cassette storage and accessing system as defined in claim 18 further including alignment structure for maintaining said cassette carriers substantially even and parallel for the greater portion of the length of said flexible drive lines, as the cassette carriers are moved from one end of said frame to the other end thereof.

20. A compact tape cassette storage and accessing system as defined in claim 17 wherein said cassette carriers have space to carry 8 mm tape cassettes, and wherein the total height of said system does not exceed one rack unit or 1¾ inch.

21. A compact tape cassette storage and accessing system as defined in claim 17 wherein a first one of said circular drive members on one side of said frame is mounted on a shaft or axle as a second one of said circular drive members on the other side of said frame is mounted on the same said shaft or axle, to synchronize the movement of said flexible drive lines.

* * * * *